United States Patent
Kim et al.

(10) Patent No.: US 11,367,929 B2
(45) Date of Patent: Jun. 21, 2022

(54) ELECTRICAL ASSEMBLY AND BATTERY PACK INCLUDING ELECTRICAL ASSEMBLY

(71) Applicant: LG Chem, Ltd., Seoul (KR)

(72) Inventors: Do-Hyeon Kim, Daejeon (KR);
Tae-Young Kang, Daejeon (KR);
Duck-Hee Moon, Daejeon (KR);
Jun-Yeob Seong, Daejeon (KR);
Sung-Chun Yu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 187 days.

(21) Appl. No.: 16/612,064

(22) PCT Filed: Nov. 28, 2018

(86) PCT No.: PCT/KR2018/014871
§ 371 (c)(1),
(2) Date: Nov. 8, 2019

(87) PCT Pub. No.: WO2019/107938
PCT Pub. Date: Jun. 6, 2019

(65) Prior Publication Data
US 2020/0168879 A1    May 28, 2020

(30) Foreign Application Priority Data
Dec. 1, 2017   (KR) .................. 10-2017-0164097

(51) Int. Cl.
*H01M 50/50*      (2021.01)
*H01M 50/502*     (2021.01)
(Continued)

(52) U.S. Cl.
CPC ......... *H01M 50/502* (2021.01); *H01M 50/20* (2021.01); *H01M 50/543* (2021.01); *H01M 50/561* (2021.01); *H01M 2220/20* (2013.01)

(58) Field of Classification Search
CPC .. H01M 50/502; H01M 50/20; H01M 50/543; H01M 2220/20; H01M 50/561; H01M 50/50; Y02E 60/10
See application file for complete search history.

(56) References Cited

U.S. PATENT DOCUMENTS

2011/0097620 A1   4/2011   Kim
2013/0095369 A1   4/2013   Yoon et al.
(Continued)

FOREIGN PATENT DOCUMENTS

CN   102044693 A   5/2011
CN   102630352 A   8/2012
(Continued)

OTHER PUBLICATIONS

An English machine translation for No. KR-10-0673609-B1, dated Jan. 24, 2007.
(Continued)

*Primary Examiner* — Michael L Dignan
(74) *Attorney, Agent, or Firm* — Birch, Stewart, Kolasch & Birch, LLP

(57) ABSTRACT

An electrical assembly includes a plate unit disposed on a battery module, at least one electrical equipment loaded on the plate unit, and a pack terminal loaded on the plate unit. The pack terminal includes a terminal bolt configured to be contacted and connected to a connector of an external device; and a nut configured to be fastened to the terminal bolt. The electrical assembly further includes at least one bus bar loaded on the plate unit and configured to electrically connect the pack terminal to a module terminal of the battery (Continued)

module. At a side portion of the plate unit, an insert portion that is open to allow the nut to be inserted therein is formed, and a slot portion is formed to fix the nut inserted through the insert portion at a predetermined position.

15 Claims, 10 Drawing Sheets

(51) Int. Cl.
*H01M 50/20* (2021.01)
*H01M 50/543* (2021.01)
*H01M 50/552* (2021.01)

(56) References Cited

U.S. PATENT DOCUMENTS

| | | |
|---|---|---|
| 2013/0122339 A1 | 5/2013 | Chae et al. |
| 2014/0364016 A1 | 12/2014 | Ozawa et al. |
| 2015/0345602 A1 | 12/2015 | Funada et al. |
| 2016/0072118 A1 | 3/2016 | Park et al. |
| 2016/0272132 A1 | 9/2016 | Hachiya |
| 2016/0372736 A1* | 12/2016 | Kim .................... H01M 50/543 |
| 2018/0145289 A1 | 5/2018 | Yu et al. |
| 2019/0081292 A1* | 3/2019 | Shimizu ................ H01M 50/20 |

FOREIGN PATENT DOCUMENTS

| | | | |
|---|---|---|---|
| CN | 105547492 A | 5/2016 | |
| CN | 105684250 A | 6/2016 | |
| JP | 60-155177 U | 10/1985 | |
| JP | H07254445 A | 10/1995 | |
| JP | 7-320718 A | 12/1995 | |
| JP | H07-320718 | * 12/1995 | ............. H01M 2/30 |
| JP | 2002-10445 A | 1/2002 | |
| JP | 2014-88919 A | 5/2014 | |
| JP | 2014-238956 A | 12/2014 | |
| JP | 2017-130280 A | 7/2017 | |
| KR | 20-1999-0039984 U | 11/1999 | |
| KR | 10-0673609 B1 | 1/2007 | |
| KR | 20-2009-0004141 U | 5/2009 | |
| KR | 10-2015-0140120 A | 12/2015 | |
| KR | 10-2016-0008948 A | 1/2016 | |
| KR | 10-2017-0095070 | * 8/2017 | ............. H01M 2/10 |
| KR | 10-2017-0095070 A | 8/2017 | |
| WO | WO 2017/111280 A1 | 6/2017 | |
| WO | WO 2017/158773 A1 | 9/2017 | |

OTHER PUBLICATIONS

Extended European Search Report, dated Oct. 30, 2020, for European Application No. 18884099.5.

* cited by examiner

ELECTRICAL ASSEMBLY AND BATTERY PACK INCLUDING ELECTRICAL ASSEMBLY

CROSS-REFERENCES TO RELATED APPLICATIONS

This application is a U.S. national phase application, pursuant to 35 U.S.C. § 371 of PCT/KR2018/014871, filed Nov. 28, 2018, designating the United States, which claims priority to Korean Application No. 10-2017-0164097, filed Dec. 1, 2017. The entire contents of the aforementioned patent applications are incorporated herein by this reference.

TECHNICAL FIELD

The present disclosure relates to an electrical assembly and a battery pack including the electrical assembly, and more particularly, to an electrical assembly having a pack terminal with improved manufacturing efficiency and completeness, and a battery pack including the electrical assembly.

BACKGROUND ART

Recently, the demand for portable electronic products such as notebook computers, video cameras and portable telephones has increased sharply, and electric vehicles, energy storage batteries, robots, satellites and the like have been developed earnestly. Accordingly, high-performance secondary batteries allowing repeated charging and discharging are being actively studied.

Secondary batteries currently commercialized include nickel cadmium batteries, nickel hydrogen batteries, nickel zinc batteries, lithium secondary batteries and on the like. Among them, the lithium secondary batteries are more highlighted in comparison to nickel-based secondary batteries due to advantages such as flexible charging and discharging, due to substantially no memory effect, very low self-discharge rate, and high energy density.

The lithium secondary battery generally uses lithium-based oxides and carbonaceous materials as a positive electrode active material and a negative electrode active material, respectively. The lithium secondary battery includes an electrode assembly in which a positive electrode plate coated with the positive electrode active material and a negative electrode plate coated with the negative electrode active material are disposed with a separator interposed therebetween; and an exterior, namely a battery case, for sealably containing the electrode assembly together with an electrolyte.

Generally, the lithium secondary battery may be classified based on the shape of the exterior into a can-type secondary battery in which the electrode assembly is included in a metal can, and a pouch-type secondary battery in which the electrode assembly is included in a pouch made of aluminum laminate sheets.

In recent years, secondary batteries have been widely used not only in small-sized devices such as portable electronic devices but also in medium-to-large-sized devices such as vehicles and power storage devices. In particular, as carbon-based energy is getting depleted and the interest in the environment increases, attention is focused on hybrid electric vehicles and electric vehicles throughout the world, including the United States, Europe, Japan, and Korea.

The most critical component of the hybrid electric vehicle or the electric vehicle is a battery pack that provides an operation power to a vehicle motor. Since the hybrid electric vehicle or the electric vehicle is able to obtain the operating power through charging and discharging of the battery pack, it is possible to ensure excellent fuel efficiency and eliminate or reduce the emission of pollutants, compared to a vehicle using only an engine. For this reason, hybrid electric vehicles and electric vehicles are used increasingly.

In addition, the battery pack of the hybrid electric vehicle or the electric vehicle includes a plurality of secondary batteries, and the plurality of secondary batteries are connected in series or in parallel to improve capacity and output.

Meanwhile, the battery pack may include several electrical components in addition to a plurality of secondary batteries, and these electrical components are also referred to as electrical equipment. Representative examples of electrical equipment included in the battery pack include a relay, a current sensor, a fuse, and a battery management system (BMS). The electrical equipment is a component for managing charging and discharging of the secondary batteries included in the battery pack and ensuring safety, which is essential for most battery packs.

Further, a pack terminal may be provided as a part of the electrical equipment. Since the pack terminal is usually regulated or configured based on the demand of a consumer who purchases the battery pack, it is important to design the battery pack to allow the pack terminal to be formed at a correct position in accordance with the demand of the consumer.

However, since the pack terminal is required to be assembled at a final stage of the manufacturing process due to the nature of the battery pack structure, the position of the installed pack terminal is likely to be slightly different from a designed position, and it is very difficult to manage the cumulative tolerance caused by assembling a plurality of components.

Accordingly, a manufactured battery pack may be discarded due to a defective position of the pack terminal of the battery pack, which causes a significant cost loss.

Therefore, there is a need for a technique capable of solving the above problems of the prior art.

DISCLOSURE

Technical Problem

The present disclosure is designed to solve the problems of the related art, and therefore the present disclosure is directed to providing an electrical assembly having a pack terminal with improved manufacturing efficiency and completeness, and a battery pack including the electrical assembly.

These and other objects and advantages of the present disclosure may be understood from the following detailed description and will become more fully apparent from the exemplary embodiments of the present disclosure. Further, it will be easily understood that the objects and advantages of the present disclosure may be realized by the means shown in the appended claims and combinations thereof.

Technical Solution

In one aspect of the present disclosure, there is provided an electrical assembly that includes:
a plate unit disposed on a battery module;
at least one electrical equipment loaded on the plate unit;
a pack terminal loaded on the plate unit and having a terminal bolt configured to be contacted and connected to a connector of an external device and a nut configured to be fastened to the terminal bolt; and at least one bus bar loaded on the plate unit and configured to electrically connect the pack terminal to a module terminal of the battery module.

At a side portion of the plate unit, an insert portion that is open to allow the nut to be inserted therein is formed, and a slot portion is formed to fix the nut inserted through the insert portion at a predetermined position.

Moreover, the slot portion may include:

a sliding region having a moving space that extends in a horizontal direction from the insert portion to allow the nut inserted into the insert portion to slide therein; and a placing region communicating with the sliding region and allowing the nut to be placed thereon, the placing region having an upper opening to allow the terminal bolt to be inserted downwards from above.

In addition, the plate unit may include a depressed step that is depressed inwards at a side end of an upper surface of the plate unit to allow at least a portion of the sliding region to be open upwards.

Moreover, a support rib that protrudes upwards may be formed at a lower surface of the placing region to support a lower surface of the nut.

In addition, the support rib may be formed to extend in a horizontal direction along which the nut slides.

Further, an inclined portion connected to the support rib and protruding upwards to have a protruding height that gradually increases toward the support rib may be formed at the lower surface of the placing region.

In addition, the nut may include a support portion positioned to face an inner lower surface and an inner side surface of the slot portion; and a ring portion having a diameter smaller than a planar size of the support portion and protruding upwards from an upper portion of the support portion.

Further, the inner lower end of the slot portion may have a greater width than the inner upper end of the slot portion to allow both side portions of the support portion to be inserted.

The support portion may have a polygonal planar structure.

Moreover, the inner side surface of the upper opening of the placing region may be formed to be in contact with an outer circumference of the ring portion.

In addition, a fixing protrusion that protrudes to press the side portion of the ring portion may be formed at the inner side surface of the upper opening of the placing region.

Further, an aperture may be formed in the support portion and the ring portion to allow the terminal bolt to pass therethrough.

A chamfer structure may be formed at an upper portion of the aperture of the ring portion to have an inner diameter that gradually decreases downwards.

Moreover, the slot portion may have a recessed portion communicating with the aperture and formed by recessing a portion of the lower surface of the placing region downwards.

In addition, the electrical assembly may include a bus bar mounting groove depressed inwards to allow the at least one bus bar to be mounted onto an upper surface thereof, and a part of a lower surface of the bus bar mounting groove may communicate with the upper opening of the placing region.

In another aspect of the present disclosure, there is also provided a battery pack, comprising:

the electrical assembly described herein;

a battery module having a plurality of secondary batteries;

a lower housing having an open portion that is open upwards and an inner space formed therein to allow the battery module to be disposed in the inner space; and an upper housing configured to cover the upper open portion of the lower housing and having an opening formed to allow a portion of the pack terminal to protrude outwards.

Further, in another aspect of the present disclosure, there is also provided a vehicle, which includes the battery pack described herein.

Advantageous Effects

According to an exemplary embodiment of the present disclosure, since a nut may be easily inserted and fixed through a slot portion formed in a plate unit of an electrical assembly, the manufacturing process may be simplified, and the manufacturing time may be decreased, thereby reducing the production cost.

Further, according to an exemplary embodiment of the present disclosure, since the depressed step formed at a side end of the upper surface of the plate unit opens a portion of the sliding region communicating with the insert portion upwardly, the nut may be more easily inserted into the insert portion.

Moreover, according to an exemplary embodiment of the present disclosure, since the support rib separates the nut from the lower surface of the placing region by a predetermined distance, while a terminal bolt is being inserted and fastened into the nut, the lower portion of the round rod may be prevented from colliding with the lower surface of the placing region, thereby effectively reducing the defect rate of the product.

Further, since the support rib may allow the nut to be placed and fixed merely by sliding the nut to the slot portion without a separate fixing member, the material cost and time may be decreased, while ensuring easier manufacturing, thereby improving the manufacturing efficiency.

In addition, according to an exemplary embodiment of the present disclosure, the inclined portion may be moved to the support rib over the top surface of the inclined portion to allow the nut to be easily placed on the support rib while sliding. Accordingly, the nut may be more easily inserted into the placing region of the slot portion, thereby improving the manufacturing efficiency.

Further, according to an exemplary embodiment of the present disclosure, since the fixing protrusion formed at the inner side surface of the opening at the upper end of the placing region effectively prevents the nut from sliding toward the insert portion after being inserted into and placed on the placing region, the process efficiency for nut insertion may be increased, and the position of the terminal bolt may be effectively prevented from being changed after the terminal bolt is fastened.

Further, according to an exemplary embodiment of the present disclosure, the chamfer structure of the nut may guide the fastening of the terminal bolt and also exert a moving force to the nut to allow the position of the nut to be corrected based on the position of the terminal bolt.

Moreover, according to an exemplary embodiment of the present disclosure, since a gap of a predetermined size spaced from the outer surface of the nut is formed at the placing region of the slot portion, the cumulative tolerance for the position of the terminal bolt may be effectively decreased.

DESCRIPTION OF DRAWINGS

The accompanying drawings illustrate a preferred exemplary embodiment of the present disclosure and together

BEST MODE

Hereinafter, preferred exemplary embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is merely a preferable example for the purpose of illustrations only, not intended to limit the scope of the disclosure, so it should be understood that other equivalents and modifications could be made thereto without departing from the scope of the disclosure.

Figure 1:
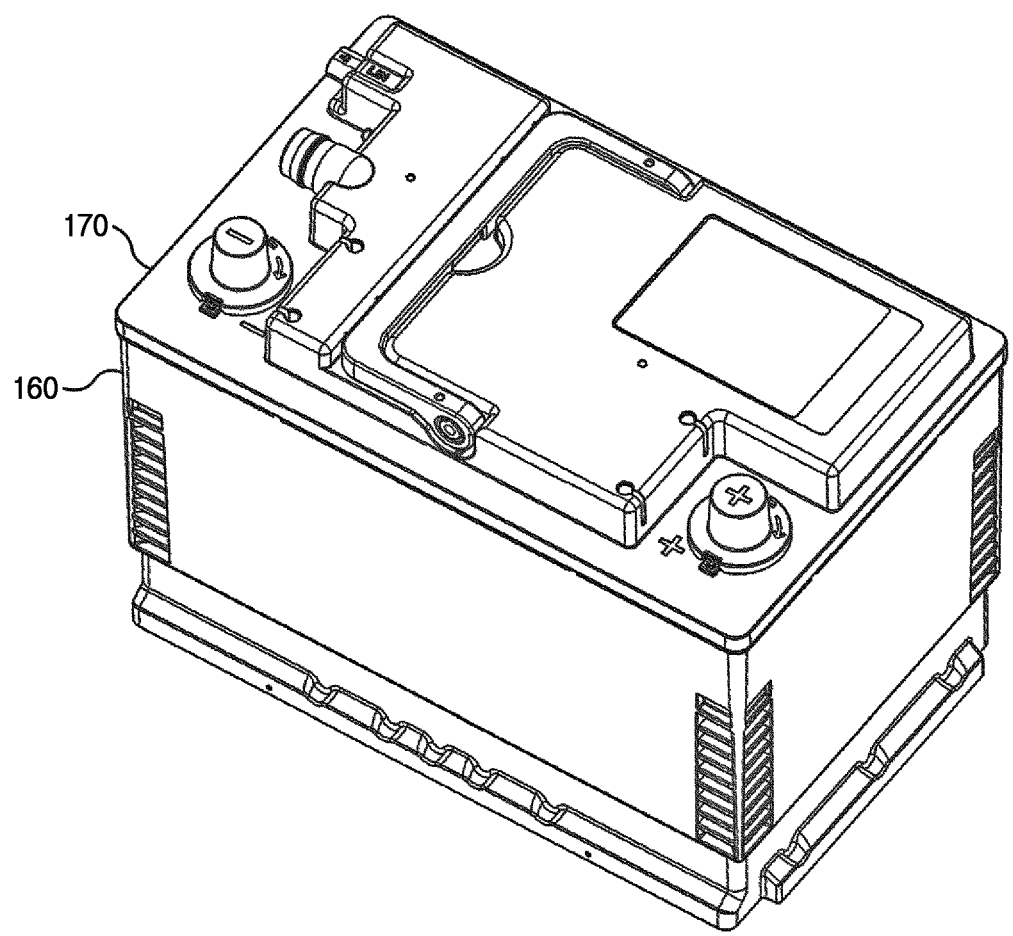
FIG. 1 is a perspective view schematically showing a battery pack according to an exemplary embodiment of the present disclosure.
Figure 2:
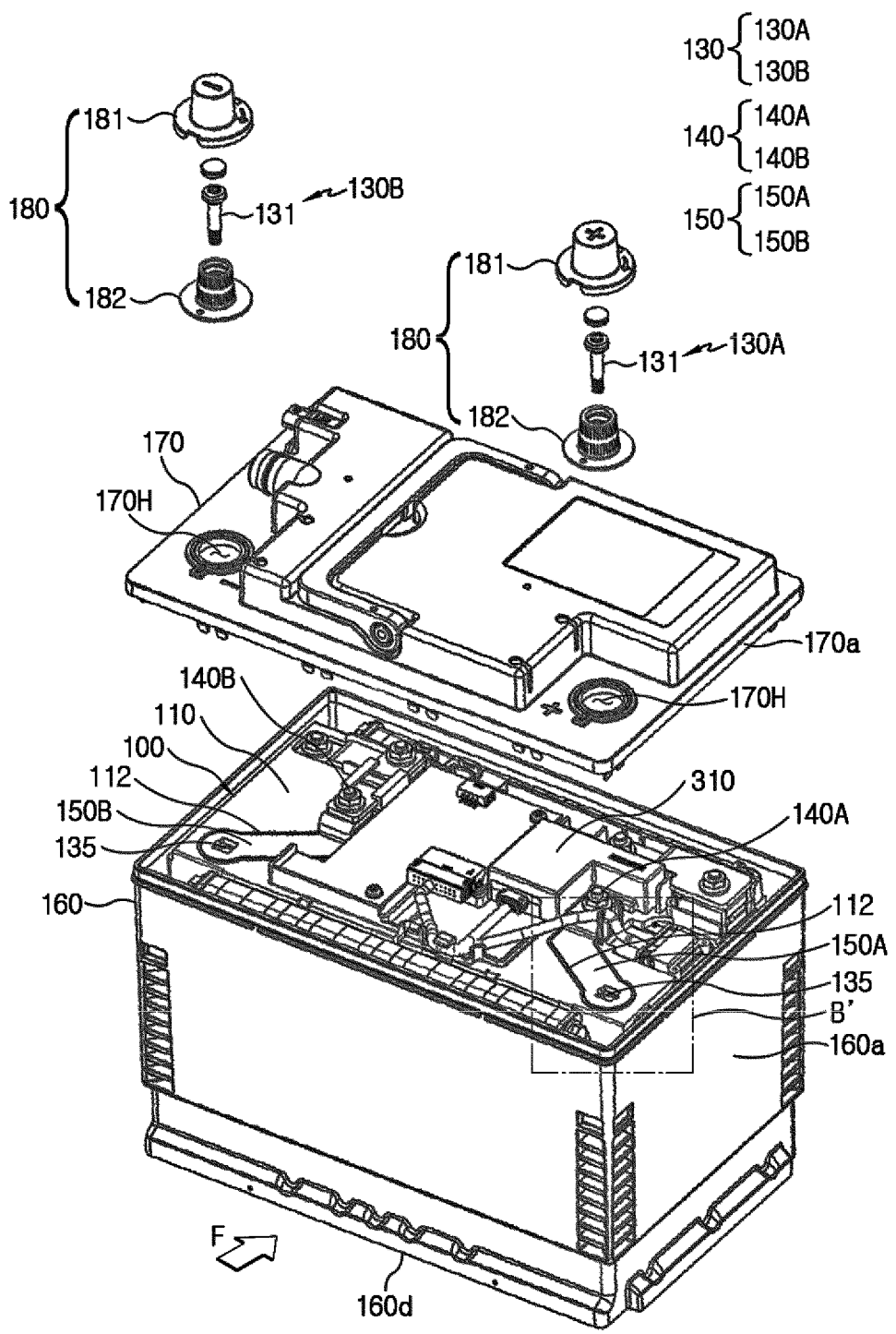
FIG. 2 an exploded perspective view schematically showing some components of the battery pack according to an exemplary embodiment of the present disclosure.
Figure 3:
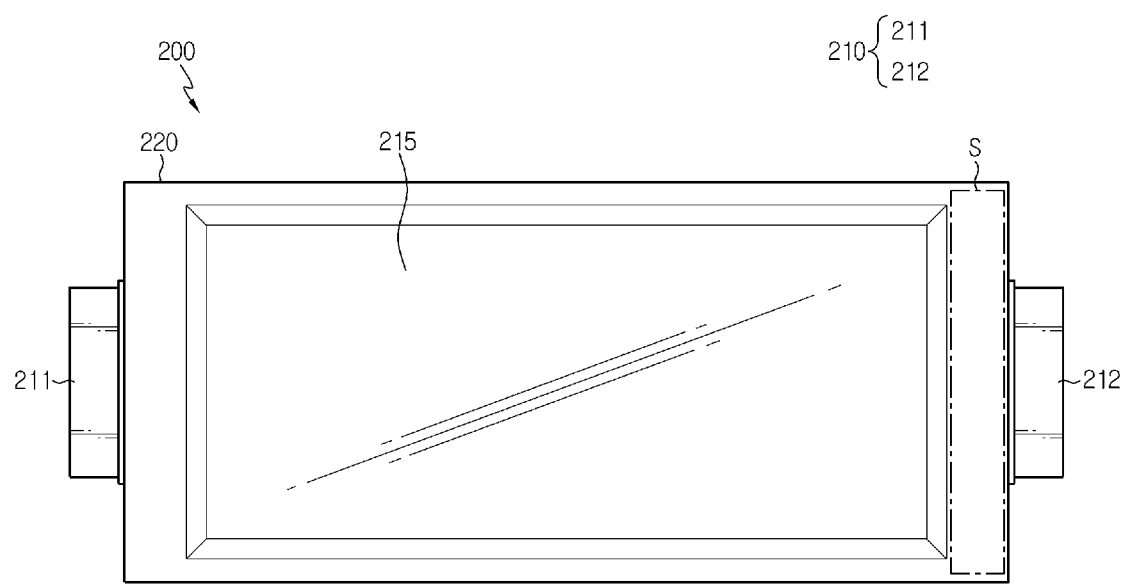
FIG. 3 is a plan view schematically showing a secondary battery, which is a component of the battery pack according to an exemplary embodiment of the present disclosure.

FIG. 1 is a perspective view schematically showing a battery pack according to an exemplary embodiment of the present disclosure. FIG. 2 an exploded perspective view schematically showing some components of the battery pack according to an exemplary embodiment of the present disclosure. FIG. 3 is a plan view schematically showing a secondary battery, which is a component of the battery pack according to an exemplary embodiment of the present disclosure.

Referring to FIGS. 1 to 3, a battery pack 300 according to an exemplary embodiment of the present disclosure may include a battery module (not shown), a lower housing 160, an upper housing 170, and an electrical assembly 100.

The battery module may include a plurality of secondary batteries 200. Further, the plurality of secondary batteries 200 may have a stacking structure where the plurality of secondary batteries 200 are connected in series or in parallel and stacked on one another.

The secondary battery 200 may be a pouch-type secondary battery 200. In particular, the pouch-type secondary battery 200 may include an electrode assembly (not shown), an electrolyte (not shown) and a pouch 220.

The pouch 220 may be composed of two pouches, namely a left pouch and a right pouch, each having a concave accommodation portion 215. The electrode assembly and the electrolyte may be accommodated within the accommodation portion 215. In addition, each of the left pouch and the right pouch includes an outer insulating layer, a metal layer, and an inner adhesive layer. Further, the inner adhesive layers at edges of the left pouch and the right pouch may be fused to each other to form a sealing portion. Moreover, terrace portions S may be formed at both end portions of the pouch 220 at which a positive electrode lead 211 and a negative electrode lead 212 are formed, respectively.

The electrode assembly may be an assembly of a separator and an electrode plate containing an electrode active material, and, for example, at least one positive electrode plate and at least one negative electrode plate may be disposed with a separator interposed therebetween. In addition, a positive electrode tab may be provided at the positive electrode plate of the electrode assembly, and at least one positive electrode tab may be connected to the positive electrode lead 211.

The positive electrode lead 211 may include one end connected to the positive electrode tab and the other end exposed to exterior of the pouch 220. The exposed portion may serve as an electrode terminal of the secondary battery 200, for example a positive electrode terminal of the secondary battery 200.

A negative electrode plate of the electrode assembly may include a negative electrode tab, and at least one negative electrode tab may be connected to a negative electrode lead 212. In addition, the negative electrode lead 212 may include one end connected to the negative electrode tab and the other end exposed to exterior of the pouch, and the exposed portion may serve as an electrode terminal of the secondary battery 200, for example a negative electrode terminal of the secondary battery 200.

Moreover, the positive electrode lead 211 and negative electrode lead 212 may be formed at both ends opposite to each other, with respect to the center of the secondary battery 200. Namely, the positive electrode lead 211 may be provided at one end portion, with respect to the center of the secondary battery 200. In addition, the negative electrode lead 212 may be provided at the other end portion, with respect to the center of the secondary battery 200.

For example, as shown in FIG. 3, each of the plurality of secondary batteries 200 may be configured to allow the positive electrode lead 211 and the negative electrode lead 212 to protrude forward and backward, respectively. Thus, according to this configuration of the present disclosure, in one secondary battery 200, interference between the positive electrode lead 211 and the negative electrode lead 212 may be prevented, thereby widening the area of the electrode lead 210.

In addition, the positive electrode lead 211 and the negative electrode lead 212 may have a plate form. In particular, the positive electrode lead 211 and the negative electrode lead 212 may protrude in a horizontal direction in a standing state to allow their broad surfaces to be oriented to a left side and a right side.

However, the battery module according to the present disclosure is not limited to the pouch-type secondary battery 200 described above, and various kinds of secondary batteries 200 known at the time of filing of this application may be employed.

Meanwhile, the plurality of secondary batteries 200 may be pouch-type secondary batteries 200. In addition, the pouch-type secondary batteries 200 may be stacked in a vertical direction or in a horizontal direction to allow their large surfaces to face each other. In particular, in order to facilitate stacking of the pouch-type secondary batteries 200, the battery module may further include a cartridge. The cartridge may be configured to hold the secondary batteries 200 to stack the secondary batteries 200 on one another without moving. In particular, the cartridge may be made of a polymer material and configured to surround a rim of the pouch-type secondary battery 200. For example, the cartridge may be configured in the form of a rectangular ring with four unit frames whose both ends are interconnected to each other.

In addition to the secondary battery 200 and the cartridge, the battery module may further include end plates made of a metal material and disposed at top and bottom portions of the secondary battery 200, a duct for introducing air into and out of the battery module, and a sensing assembly connected to an electrode lead of the secondary battery 200 to detect a voltage of the secondary battery 200, and the like.

Referring to FIG. 2 again, the plate unit 110 may be disposed on the battery module when viewed in a direction denoted as F (depicted in FIG. 2), and at least one electrical equipment 310 may be loaded thereon. For example, the plate unit 110 may have a generally plate-like configuration with wide and flat surfaces at top and bottom portions thereof.

Meanwhile, in this specification, the upper, lower, front, rear, right and left directions are defined based on the direction F, unless otherwise specified.

Further, the electrical equipment 310 may be loaded on the wide upper surface of the plate unit 110. The electrical equipment 310 loaded on the plate unit 110 may include at least one of a battery management system (BMS), a current sensor, a relay, and a fuse.

In addition, the electrical assembly 100 may further include a bus bar 150 made of a metal material in addition to the electrical equipment 310. The metal may be copper, aluminum, a copper alloy, an aluminum alloy, or the like.

The bus bar 150 may be loaded onto the plate unit 110 to electrically connect a pack terminal 130 and a module terminal 140 of the battery module. The bus bar 150 may provide a charging and discharging path for the battery pack 300 by connecting the pack terminal 130 to the electrode leads 210 of the plurality of secondary batteries 200 of the battery module. In addition, the bus bar 150 may be configured to electrically connect the current sensor, the relay, and the fuse.

The module terminal 140 may be a terminal configured to electrically connect the plurality of secondary batteries 200 provided in the battery module to the electrical assembly 100, and may include a positive electrode module terminal 140A and a negative electrode module terminal 140B based on electric polarity.

In addition, the pack terminal 130 may be a terminal loaded on the plate unit 110 and provided at the battery pack 300 to be used for electrically connecting an external charging and discharging device or an external electronic device to the battery pack 300. The pack terminal 130 may include a positive electrode pack terminal 130A and a negative electrode pack terminal 130B.

Specifically, the pack terminal 130 may include a terminal bolt 131 contacted and connected to a connector of an external device, and a nut 135 fastened to the terminal bolt 131.

Further, the bus bar 150 may include a positive electrode bus bar 150A and a negative electrode bus bar 150B. The positive electrode bus bar 150A electrically connects the positive electrode module terminal 140A and the positive electrode pack terminal 130A, and the negative electrode bus bar 150B electrically connects the negative electrode module terminal 140B and the negative electrode pack terminal 130B.

Since the bus bar 150 is a component for electrical connection as described above, the bus bar 150 may be made of a material with electrical conductivity. In particular, in order to secure a mechanical strength to some extent, the bus bar 150 may be made of a metal material such as copper or a copper alloy.

Meanwhile, the lower housing 160 may have an upper open portion, and may also have an inner space to allow the battery module to be disposed therein. In particular, the inner space of the lower housing 160 may be configured to be open at an upper portion thereof, to allow the battery module to be accommodated in the inner space of the lower housing 160 downwards from above. For example, the lower housing 160 may have a bottom portion 160d and a sidewall portion 160a to allow the battery module to be accommodated in the inner space defined by the bottom portion 160d and the sidewall portion 160a.

In this case, the battery module is disposed on the upper surface of the bottom portion 160d, and the side surfaces of the battery module may be covered and protected by the sidewall portion 160a. The sidewall portion 160a may have a height corresponding to a height of the battery module. In addition, the lower housing 160 may be configured to receive at least a portion of the plate unit 110 as well as the battery module.

Further, the lower housing 160 may be made of a polymer material to secure rigidity, moldabiliy, electrical insulation, and the like. However, the present disclosure is not limited to a specific material of the lower housing 160, and any material may be applied to the lower housing 160 as long as the electrical insulation is secured.

Meanwhile, the upper housing 170 may be coupled to the upper portion of the lower housing 160 to cover the upper open portion of the lower housing 160. In particular, the upper housing 170 may be coupled to an upper end of the lower housing 160 and may seal the upper open end of the lower housing 160.

For example, as shown in FIG. 2, the upper housing 170 may include a sidewall portion 170a, and the lower end of the sidewall portion 170a of the upper housing 170 may overlap the upper end of the sidewall portion 160a of the lower housing 160.

In addition, the upper housing 170 may be made of a polymer material, similar to the lower housing 160, but the present disclosure is not necessarily limited to the material of the upper housing 170.

Moreover, the upper housing 170 may have at least one opening 170H formed therethrough in a vertical direction. The opening 170H may be formed above at least one electrical equipment 310. For example, in the upper housing 170 may have an opening 170H to allow a portion of the pack terminal 130 to protrude outward through the opening 170H.

Figure 4:
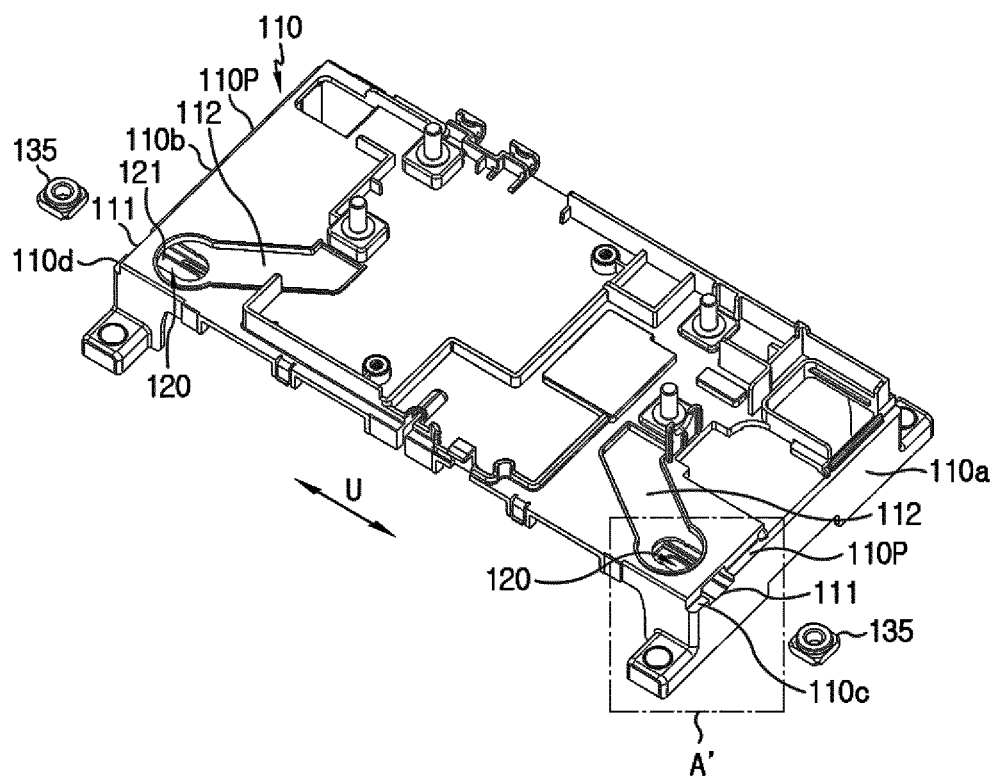
FIG. 4 is a perspective view schematically showing some components of the battery pack according to an exemplary embodiment of the present disclosure.

FIG. 4 is a perspective view schematically showing some components of the battery pack according to an exemplary embodiment of the present disclosure.

Referring to FIG. 4, an insert portion 111 may be formed in a side portion 110a of the plate unit 110 to allow the nut 135 to be inserted therein. Specifically, the insert portion 111 may have an opening with a size corresponding to the outer shape of the nut 135. In other words, the insert portion 111 may have the opening that has a size to allow the nut 135 to be inserted into the plate unit 110.

More specifically, the opening of the insert portion 111 may be greater than the size of a vertical cross-section of the central portion of the nut 135. Accordingly, the nut 135 may be inserted into the opening of the insert portion 111 formed in the side portion 110a of the plate unit 110 in a horizontal direction U so that the entire body of the nut 135 may be inserted into the plate unit 110.

Further, the plate unit 110 may have a slot portion 120 configured to fix the nut 135 inserted through the insert portion 111 to an accurate position therein.

The slot portion 120 may slide the nut 135 inserted into the insert portion 111 to be disposed at an installation position of the terminal bolt 131. For example, the slot portion 120 may be recessed inwards from the side portion 110a of the plate unit 110 to form an inner space. In addition, the slot portion 120 may have a moving space formed therein to allow the nut 135 to move therein.

Thus, according to this configuration of the present disclosure, due the plate unit 110, since the nut 135 may be easily inserted and fixed through the slot portion 120 without inserting the nut 135 therein by separate insert injection molding or the like, the manufacturing process may be simplified, and the manufacturing time may be decreased, thereby reducing the production cost.

Figure 5:
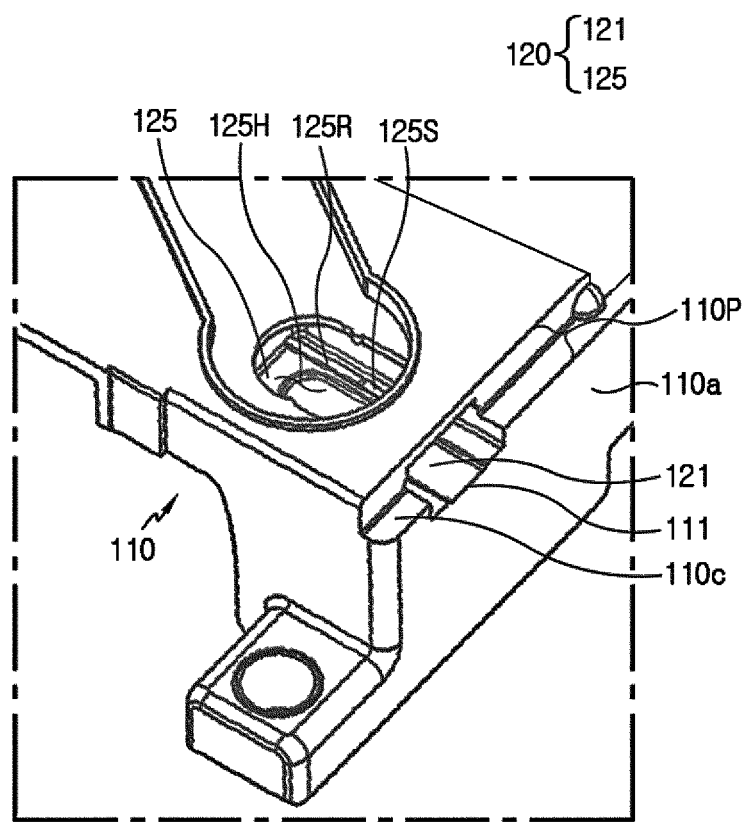
FIG. 5 is a partially enlarged view schematically showing a portion A' of the plate unit of FIG. 4.

FIG. 5 is a partially enlarged view schematically showing a portion A' of the plate unit of

FIG. 4.

Referring to FIG. 5 along with FIG. 4, the slot portion 120 may have a sliding region 121 and a placing region 125.

Specifically, the sliding region 121 may have a moving space formed therein to allow the nut 135 inserted into the insert portion 111 to slide inwards (in a horizontal direction). Further, the moving space may extend inwards (in the horizontal direction) from the insert portion 111. In other words, after being inserted through the insert portion 111, the nut 135 may slide from the outside to the inside through the moving space formed in the sliding region 121 along the horizontal direction U.

For example, as shown in FIG. 5, the slot portion 120 formed at the right end of the plate unit 110 has a sliding region 121 with a moving space that extends in a left direction from the insert portion 111 formed at the right side portion. Similarly, as shown in FIG. 4, the slot portion 120 formed at the left portion 110b of the plate unit 110 has a sliding region 121 with a moving space that extends in a right direction from insert portion 111 formed at the left portion 110b.

The placing region 125 may have an accommodation space that communicates with the sliding region 121 and allows the nut 135 to be placed therein. Further, the placing region 125 may be open upward to have an upper opening 125H to allow the terminal bolt 131 to be inserted downwards from above.

For example, as shown in FIG. 5, the slot portion 120 formed at the right side portion 110a of the plate unit 110 may have a sliding region 121 with a moving space that extends in the left direction from the insert portion 111 formed at the right side portion 110a.

In addition, the slot portion 120 may include a placing region 125 having an accommodation space that communicates with the moving space and allows the nut 135 to be placed therein.

Further, as shown in FIG. 4, the slot portion 120 formed at the left portion 110b of the plate unit 110 may include a sliding region 121 with a moving space that extends in the right direction from the insert portion 111 formed at the left portion 110b, and a placing region having an accommodation space that communicates with the moving space and allows the nut 135 to be placed therein. In addition, the upper portion of the placing region may be open to allow the terminal bolt 131 of the negative electrode pack terminal 130 to be inserted downwards from above.

Thus, according to this configuration of the present disclosure, since the slot portion 120 has the sliding region 121 capable of sliding the nut 135 into the plate unit 110 and the placing region 125 with the upper opening 125H, a worker may easily position the nut 135 at an accurate location within the plate unit 110 and easily insert the terminal bolt 131 into the nut 135, thereby decreasing the manufacturing process time.

Referring to FIG. 5 again, the plate unit 110 may have a depressed step 110P, which is depressed inwards (downwards) at a side end 110c of the upper surface of the plate unit 110. In addition, the depressed step 110P may be depressed to allow at least a part of the sliding region 121 to be open upwards.

In other words, the depressed step 110P may extend from the insert portion 111 formed at the side portion 110a of the plate unit 110 to a portion of the sliding region 121. For example, as shown in FIG. 4, the depressed step 110P may be formed at the left end 110d and the right end 110c of the upper surface of the plate unit 110, respectively.

Thus, according to this configuration of the present disclosure, since the depressed step 110P formed at the side end 110c of the upper surface of the plate unit 110 upwardly opens the portion of the sliding region 121 that communicates with the insert portion 111, a portion of the nut 135 may be inserted through the open upper portion of the sliding region 121 and then easily inserted into the insert portion 111 by pressing the nut 135 inwards.

Moreover, since it is significantly difficult to insert the nut 135 into the insert portion 111 formed only in the horizontal direction at the side portion 110a of the plate unit 110, the depressed step 110P allows the nut 135 to be inserted both in a vertical direction and a horizontal direction so that the nut 135 is inserted quickly and accurately, thereby effectively decreasing the manufacturing time.

Figure 6:
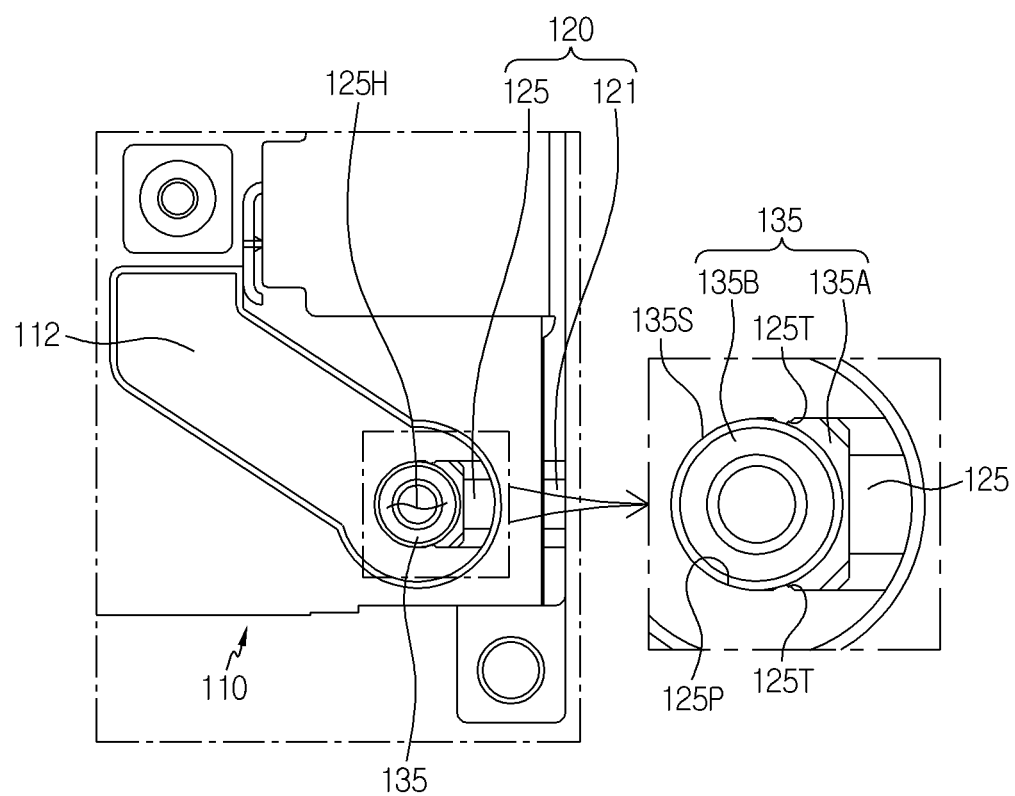
FIG. 6 is a partially enlarged plan view schematically showing that a nut is inserted into a slot portion of the plate unit at the battery pack according to an exemplary embodiment of the present disclosure.
Figure 7:
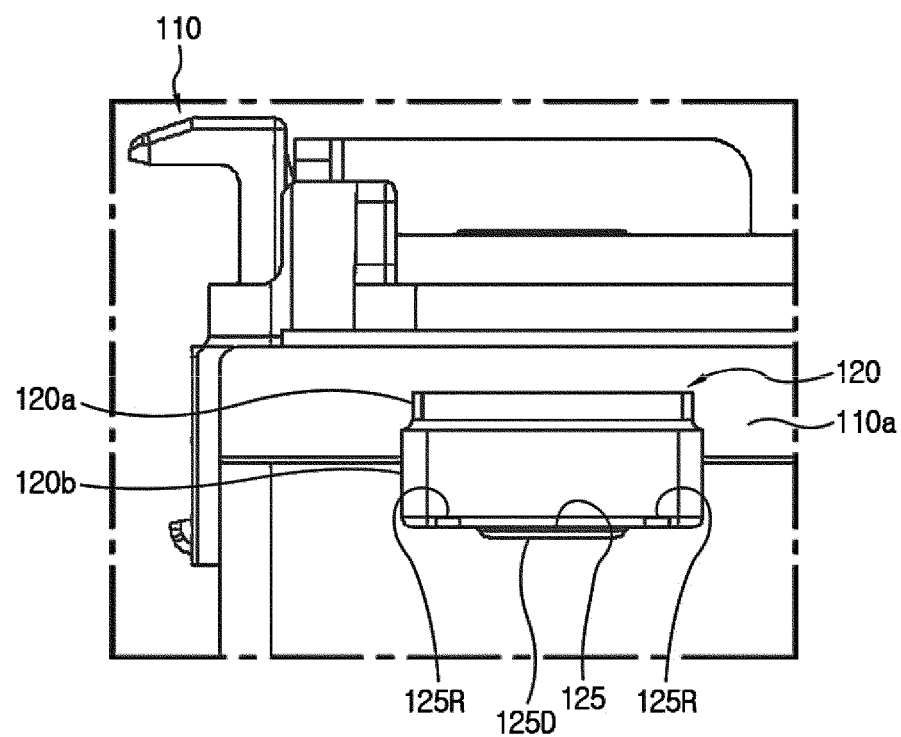
FIG. 7 is a partial side view schematically showing the plate unit of FIG. 5.

FIG. 6 is a partially enlarged plan view schematically showing that a nut is inserted into a slot portion of the plate unit at the battery pack according to an exemplary embodiment of the present disclosure. FIG. 7 is a partial side view schematically showing the plate unit of FIG. 5.

Referring to FIGS. 6 and 7 along with FIG. 5, a support rib 125R may be formed at the lower surface of the placing region 125 of the plate unit 110. Specifically, the support rib 125R may protrude upwards to support the lower surface of the nut 135. In other words, since the support rib 125R supports the lower surface of the nut 135, the nut 135 may be spaced from the lower surface of the placing region 125 by a predetermined distance.

For example, as shown in FIGS. 5 and 7, two support ribs 125R may be formed at the lower surface of the placing region 125 of the plate unit 110, and the two support ribs 125R may protrude upwards to support the lower surface of the nut 135.

Thus, according to this configuration of the present disclosure, since the support rib 125R allows the nut 135 to be spaced from the lower surface of the placing region 125 by a predetermined distance, while the terminal bolt 131 is being inserted into and fastened with the nut 135, the lower portion of the round rod of the terminal bolt 131 may be prevented from colliding with the lower surface of the placing region 125, thereby effectively reducing the defect rate of the product.

In addition, since the lower surface of the nut 135 is supported upwards by the support rib 125R, a portion of the upper portion of the nut 135 may face the upper ceiling of the placing region 125. In other words, the nut 135 may be pressed upwards by the support rib 125R at the lower surface of the placing region 125 and thus be pressurized and fixed by the lower surface of the placing region 125 and the upper ceiling.

Thus, according to this configuration of the present disclosure, due to the support rib 125R, since the nut 135 may be placed and fixed by simply sliding the nut 135 to the slot portion 120 without a separate fixing member, it is possible to decrease the material cost, ensure easy manufacturing, and shorten the manufacturing time, thereby enhancing the manufacturing efficiency.

Further, the support rib 125R may extend in the horizontal direction along which the nut 135 slides. In other words, the support rib 125R may extend in the horizontal direction along which the nut 135 slides to allow the nut 135 to be stably placed on the support rib 125R while sliding.

In addition, an inclined portion 125S (FIG. 5) may be formed at the lower surface of the placing region 125. Specifically, one side of the inclined portion 125S may be connected to the support rib 125R. The other side of the inclined portion 125S may be upwardly protruded to allow its protrusion height to gradually increase toward the support rib 125R.

Thus, according to this configuration of the present disclosure, the nut 135 may be moved to the support rib 125R over the upper surface of the inclined portion 125S, and the nut 135 may be easily placed on the support rib 125R while sliding. Accordingly, the nut 135 may be easily inserted into the placing region 125 of the slot portion 120.

Figure 8:
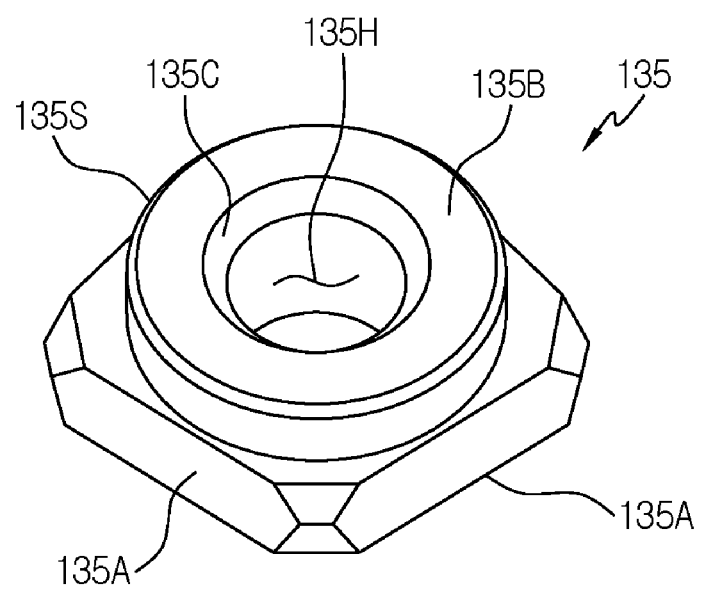
FIG. 8 is a perspective view schematically showing the nut, employed at the battery pack according to an exemplary embodiment of the present disclosure.

FIG. 8 is a perspective view schematically showing the nut, employed at the battery pack according to an exemplary embodiment of the present disclosure.

Referring to FIG. 8 along with FIG. 5, the nut 135 may include a support portion 135A and a ring portion 135B.

Specifically, the support portion 135A of the nut 135 may be positioned to face an inner lower surface and an inner side surface of the slot portion 120. In other words, the support portion 135A may have a shape corresponding to the inner structure of the slot portion 120 to face the inner lower surface and the inner side surface of the slot portion 120 when the nut 135 slides along the sliding region 121.

Referring to FIGS. 7 and 8 again, the width of the inner lower end 120b of the slot portion 120 may be greater than the width of the inner upper end 120a. In other words, since the inner lower end 120b of the slot portion 120 is wider than the inner upper end 120a, after both side portions of the support portion 135A are inserted into the inner lower end 120b of the slot portion 120, both side portions of the support portion 135A may be prevented from moving upwards.

Thus, according to this configuration of the present disclosure, since the inner lower end 120b of the slot portion 120 is wider than the inner upper end 120a, the nut 135 may be effectively prevented from being released upwards after being inserted into the slot portion 120.

In addition, the support portion 135A may have a polygonal planar structure. In other words, the support portion 135A may have a polygonal planar structure to prevent the nut 135 from rotating about the center axis of an aperture 135H after being inserted into the placing region 125 of the slot portion 120.

For example, as shown in FIG. 8, the support portion 135A serving as a lower portion of the nut 135 may have a rectangular planar structure. In other words, a side surface of the rectangular planar structure of the support portion 135A faces the inner surface of the placing region 125, to allow the inner surface of the placing region 125 to prevent the nut 135 from rotating about the center axis of the aperture 135H.

Thus, according to this configuration of the present disclosure, the support portion 135A may prevent the nut 135 from rotating while the terminal bolt 131 is rotationally inserted into the nut 135 along the thread, thereby facilitating the fastening of the terminal bolt 131.

Referring to FIG. 8 along with FIG. 6, the ring portion 135B serving as an upper portion of the nut 135 may protrude upwards from the upper portion of the support portion 135A.

Moreover, the ring portion 135B may have a smaller diameter than the planar size of the support portion 135A. In addition, an outer circumference 135S of the ring portion 135B may be formed to abut an inner side surface 125P of the upper opening 125H of the placing region 125. In other words, the ring portion 135B may be positioned to expose at least partially through the upper opening 125H of the placing region 125.

For example, as shown in FIG. 6, a portion of the ring portion 135B of the nut 135 may be positioned in contact with the inner side surface of the upper opening 125H of the placing region 125. Further, the ring portion 135B of the nut 135 may be exposed to the exterior through the upper opening 125H of the placing region 125.

Thus, according to this configuration of the present disclosure, the ring portion 135B of the nut 135 is formed with a smaller diameter than the planar size of the support portion 135A and is thus positioned to be exposed to the exterior through the upper opening 125H of the placing region 125, thereby facilitating insertion of the terminal bolt 131.

Referring to FIG. 6 again along with FIG. 5, a fixing protrusion 125T may be formed on the inner side surface of the upper opening 125H of the placing region 125 to prevent the nut 135 inserted into the placing region 125 from moving toward the insert portion 111. The fixing protrusion 125T may be formed to protrude in order to press the side portion of the ring portion 135B.

For example, as shown in FIG. 6, two fixing protrusions 125T may be formed on the inner side surface of the upper opening 125H of the placing region 125. In addition, the two fixing protrusions 125T may be protruded to press the side portions of the ring portion 135B.

Thus, according to this configuration of the present disclosure, the fixing protrusion 125T effectively prevents the nut 135 from sliding toward the insertion portion 111 after the nut 135 is inserted into and placed in the placing region 125, thereby improving the efficiency of the insertion process. In addition, the position of the terminal bolt 131 may be effectively prevented from being changed after the terminal bolt 131 is fastened.

Figure 9:
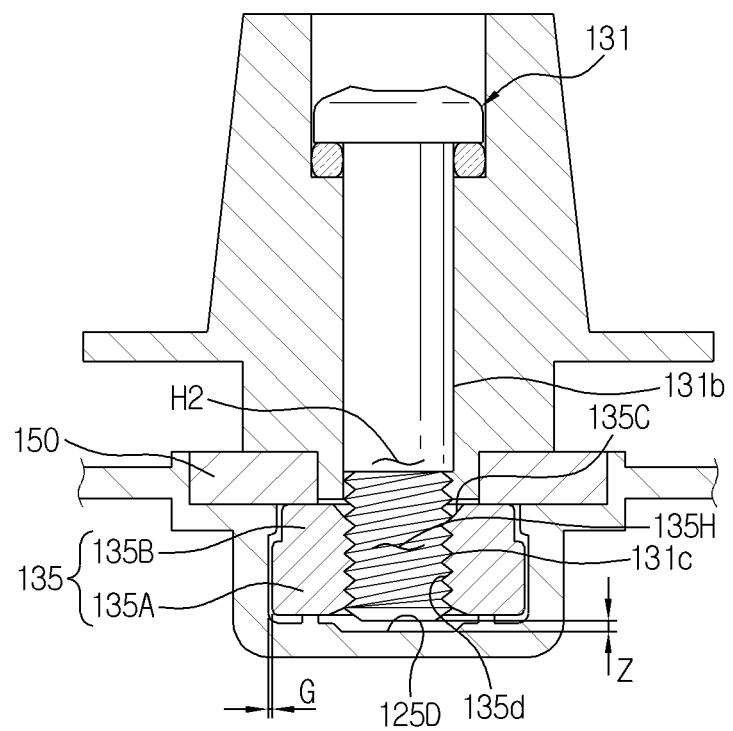
FIG. 9 is a partial vertical cross-sectional view schematically showing a vertical cross-section of a pack terminal, which is a component of the battery pack of FIG. 1.

FIG. 9 is a partial vertical cross-sectional view schematically showing a vertical cross-section of a pack terminal, which is a component of the battery pack of FIG. 1.

FIG. 9, an aperture 135H may be formed in the support portion 135A and the ring portion 135B. The aperture 135H may have an inner diameter corresponding to the diameter of a round rod 131b of the terminal bolt 131 so that the terminal bolt 131 penetrates through and be coupled to the aperture 135H. Further, a female thread 135d may be formed on the inner surface of the aperture 135H, and a male thread 131c may be formed on the outer surface of the round rod 131b of the terminal bolt 131.

Moreover, a chamfer structure 135C may be formed at the upper portion of the aperture 135H of the ring portion 135B to allow the diameter to gradually decrease downwards. In other words, the chamfer structure 135C may be inclined toward the central axis of the aperture 135H of the ring portion 135B. For example, as shown in FIG. 9, the chamfer structure 135C may be formed at the inner circumference of the aperture 135H of the ring portion 135B so that the diameter gradually decreases downwards.

Thus, according to this configuration of the present disclosure, the chamfer structure 135C of the nut 135 may guide the terminal bolt 131 to be fastened and also exert a movement force to the nut 135 to allow the position of the nut 135 to be corrected in accordance with the position of the terminal bolt 131.

In addition, a gap G of a predetermined size may be formed between the outer surface of the placing region 125 and the outer surface of the nut 135. Thus, the nut 135 may be moved within the gap G based on the position of the terminal bolt 131. For example, as shown in FIG. 9, the inner surface of the placing region 125 into which the nut 135 is inserted may have a shape corresponding to the outer surface of the nut 135 and may be spaced therefrom by a predetermined distance to form the gap G.

In other words, the gap G may be utilized as an extra space for reducing the accumulative tolerance at the installation position of the terminal bolt 131 finally assembled. Accordingly, the gap G may be formed to precisely set the position of the terminal bolt 131.

Thus, according to this configuration of the present disclosure, since the gap G of a predetermined size and spaced apart from the outer surface of the nut 135 is formed at the placing region 125 of the slot portion 120, the accumulative tolerance for the position of the terminal bolt 131 may be effectively decreased.

Referring to FIGS. 7 and 9 again, a recessed portion 125D that is recessed downwards may be formed at a portion of the lower surface of the placing region 125. Specifically, the recessed portion 125D may communicate with the aperture 135H. Further, the recessed portion 125D may be shaped to extend from the opening of the insert portion 111 to the lower surface of the placing region 125.

In addition, a recess depth Z of the recessed portion 125D may be set to prevent the lower portion of the round rod 131b of the terminal bolt 131 inserted into the aperture 135H of the nut 135 from reaching the lower surface of the placing region 125. For example, as shown in FIG. 7, the recessed portion 125D that is recessed downwards may be formed between two support ribs 125R at the lower surface of the slot portion 120.

Thus, according to this configuration of the present disclosure, when the terminal bolt 131 is inserted into the nut 135, the recessed portion 125D may effectively prevent the lower portion of the terminal bolt 131 from colliding with the lower surface of the placing region 125.

Figure 10:
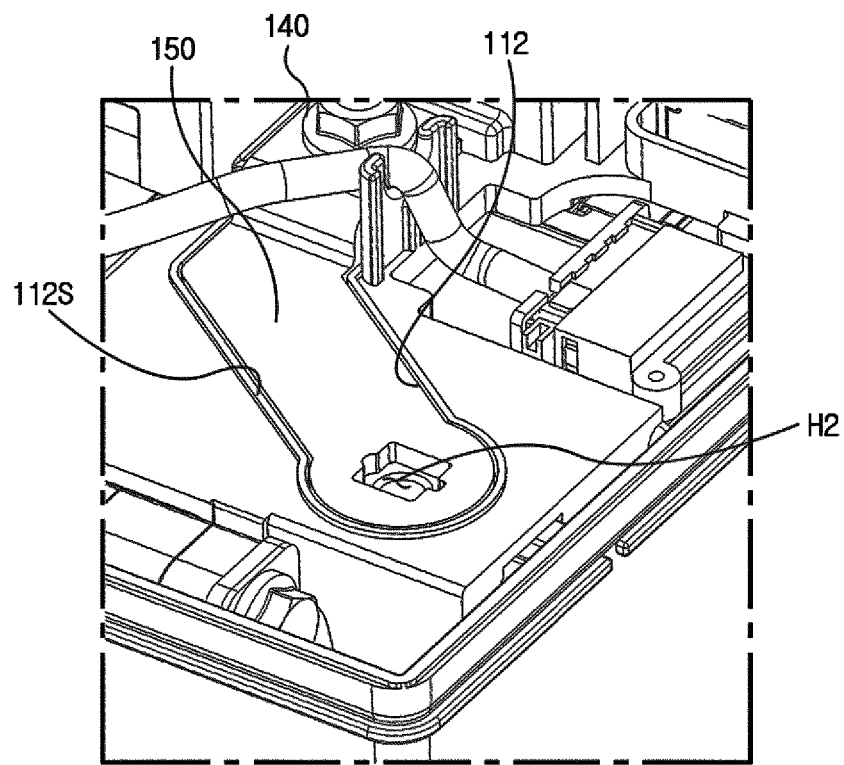
FIG. 10 is a partially enlarged view showing a portion B' of the electrical assembly of FIG. 2.

FIG. 10 is a partially enlarged view showing a portion B' of the electrical assembly of FIG. 2.

Referring to FIGS. 4 and 10, the electrical assembly 100 may have a bus bar mounting groove 112 that is recessed inwards to allow the bus bar 150 to be loaded on an upper surface thereof.

Specifically, the bus bar mounting groove 112 may be formed to allow the bus bar 150 to be inserted downwards from above. The bus bar mounting groove 112 may be configured such that the bus bar 150 is inserted into the bus bar mounting groove 112 without protruding outward. Further, a barrier 112S that protrudes upwards may be formed at the outer circumference of the bus bar mounting groove 112.

For example, as shown in FIGS. 2 and 10, two bus bar mounting grooves 112 may be formed at the plate unit 110, and one bus bar 150 may be loaded in each of the two bus bar mounting grooves 112. The barrier 112S that protrudes upwards may be formed at the outer circumferences of the two bus bar mounting grooves 112, respectively.

Thus, according to this configuration of the present disclosure, the bus bar mounting groove 112 is formed to have an indented structure to which the bus bar 150 is easily loaded, and the barrier 112S is formed to prevent the loaded bus bar 150 from contacting an external conductive object. Thus, the bus bar 150 may be stably loaded, thereby enhancing the stability of the product.

Referring to FIG. 6 again, the lower surface of the bus bar mounting groove 112 may be configured to communicate with the upper opening 125H of the placing region 125.

Referring to FIG. 10 again along with FIG. 6, a fastening hole (not shown) may be formed at one end of the bus bar 150 to allow the module terminal 140 to be inserted therethrough and fastened therewith in contact. Further, the other end of the bus bar 150 may be disposed at a portion communicating with the bus bar mounting groove 112 and the upper opening 125H of the placing region 125.

In addition, the other end of the bus bar 150 may have an insert hole H2 that is open to allow the terminal bolt 131 to be inserted therein. Moreover, the periphery of the insert hole H2 of the bus bar 150 may be contacted and connected with the nut 135.

For example, as shown in FIGS. 2 and 9, two module terminals 140 may be formed at the electrical assembly 100, and the bus bars 150 respectively connected to the two module terminals 140 may be loaded in two bus bar mounting grooves 112 formed at the plate unit 110. In addition, one ends of the two bus bars 150 may be respectively contacted and fastened with the two module terminals 140 through the fastening hole (not shown), and the other end of the bus bar 150 may have an inserted hole H2 that is open to allow the terminal bolt 131 to be inserted therein.

Referring to FIG. 9, the lower surface of the periphery of the insert hole H2 of the bus bar 150 may be contacted and connected with the upper surface of the nut 135 exposed to the upper opening 125H of the placing region 125.

Moreover, in a state where the bus bar 150 is loaded in the bus bar mounting groove 112, the terminal bolt 131 may be inserted into the insert hole H2 of the bus bar 150 and the aperture 135H of the nut 135. In other words, the terminal bolt 131 may be electrically connected to a plurality of secondary batteries 200 of the battery module via the bus bar 150 loaded to the plate unit 110.

Referring to FIG. 2 again, the electrical assembly 100 may further include an insulation cap 180. The insulation cap 180 may be formed to surround the outer surface of the terminal bolt 131 such that the terminal bolt 131 provides electrical insulation from an external matter. In addition, the insulation cap 180 may include a lower cap 182 loaded and fixed to the upper surface of the upper housing 170 and an upper cap 181 loaded to the upper portion of the lower cap 182.

Meanwhile, even though it is illustrated in various exemplary embodiments that the battery pack 300 includes only one electrical assembly 100, the present disclosure is not necessarily limited thereto, and the battery pack 300 of the present disclosure may also include two or more electrical assemblies 100.

In addition, the battery pack 300 according to the present disclosure may be applied to vehicles such as electric vehicles or hybrid electric vehicles. In other words, the vehicle according to the present disclosure may include the battery pack 300 of the present disclosure as described above.

The present disclosure has been described in detail. However, it should be understood that the detailed description and specific examples, while indicating preferred exemplary embodiments of the disclosure, are given by way of illustration only, since various changes and modifications within the scope of the disclosure will become apparent to those skilled in the art from this detailed description.

Meanwhile, even though the terms indicating directions such as upper, lower, left and right directions are used in the specification, it is obvious to those skilled in the art that these merely represent relative locations for convenience in explanation and may vary based on a location of an observer or an object.

REFERENCE SIGNS

300: battery pack
310: electrical equipment
200: secondary battery
100: electrical assembly
130: pack terminal
131: terminal bolt
135: nut
135A: support portion
135B: ring portion
135H: aperture
135C: chamfer structure
140: module terminal
150: bus bar
H2: insert hole
110: plate unit
111: insert portion
120: slot portion
121: sliding region
125: placing region
110P: depressed step
125R: support rib
125T: fixing protrusion
125D: recessed portion
112: bus bar mounting groove
160: lower housing
170: upper housing

INDUSTRIAL APPLICABILITY

The present disclosure relates to an electrical assembly and a battery pack including the electrical assembly. In addition, the present disclosure is applicable to industries associated with electronic devices or vehicles including the battery pack.

What is claimed is:

1. An electrical assembly, comprising:
a plate unit disposed on a battery module;
at least one electrical equipment loaded on the plate unit;
a pack terminal loaded on the plate unit, wherein the pack terminal includes a terminal bolt configured to be contacted and connected to a connector of an external device; and a nut configured to be fastened to the terminal bolt; and
at least one bus bar loaded on the plate unit and configured to electrically connect the pack terminal to a module terminal of the battery module,
wherein, at a side portion of the plate unit, an insert portion is located between an upper surface and a lower surface of the plate unit, the insert portion forming a hole between an edge of the upper surface and an edge of the lower surface and laterally opening to allow the nut to be inserted therein, and a slot portion is formed to fix the nut inserted through the insert portion at a predetermined position,
wherein a bus bar mounting groove is formed into the upper surface of the plate unit and is depressed inwards from the upper surface of the plate unit to allow the at least one bus bar to be mounted onto the upper surface of the plate unit without protruding outward from the upper surface of the plate unit, and
wherein a portion of the bus bar mounting groove overlaps the nut.

2. The electrical assembly according to claim 1, wherein the slot portion includes:
a sliding region having a moving space that extends in a horizontal direction from the insert portion to allow the nut inserted into the insert portion to slide therein; and
a placing region communicating with the sliding region and allowing the nut to be placed thereon, the placing region having an upper opening to allow the terminal bolt to be inserted downwards from above.

3. The electrical assembly according to claim 2, wherein the plate unit includes a depressed step that is depressed inwards at a side end of an upper surface of the plate unit to allow at least a portion of the sliding region to be open upwards.

4. The electrical assembly according to claim 2, wherein a support rib that protrudes upwards is formed at a lower surface of the placing region to support a lower surface of the nut.

5. The electrical assembly according to claim 4, wherein the support rib is formed to extend in a horizontal direction along which the nut slides, and
wherein an inclined portion connected to the support rib and protruding upwards to have a protruding height that gradually increases toward the support rib is formed at the lower surface of the placing region.

6. The electrical assembly according to claim 2, wherein the nut includes:
a support portion positioned to face an inner lower surface and an inner side surface of the slot portion; and
a ring portion having a diameter smaller than a planar size of the support portion and protruding upwards from an upper portion of the support portion,
wherein an inner lower end of the slot portion has a greater width than an inner upper end of the slot portion to allow both side portions of the support portion to be inserted.

7. The electrical assembly according to claim 6, wherein the support portion has a polygonal planar structure.

8. The electrical assembly according to claim 6, wherein the inner side surface of the upper opening of the placing region is formed to be in contact with an outer circumference of the ring portion, and wherein a fixing protrusion that protrudes to press a side portion of the ring portion is formed at the inner side surface of the upper opening of the placing region.

9. The electrical assembly according to claim 6, wherein an aperture is formed in the support portion and the ring portion to allow the terminal bolt to pass therethrough, and wherein a chamfer structure is formed at an upper portion of the aperture of the ring portion to have an inner diameter that gradually decreases downwards.

10. The electrical assembly according to claim 9, wherein the slot portion has a recessed portion communicating with the aperture and formed by recessing a portion of the lower surface of the placing region downwards.

11. The electrical assembly according to claim 2, wherein part of a lower surface of the at least one bus bar mounting groove communicates with the upper opening of the placing region.

12. The electrical assembly according to claim 11, wherein a portion of the upper surface of the plate unit is interposed between the nut and the at least one bus bar.

13. A battery pack, comprising:
the electrical assembly according to any one of claim 1;
a battery module having a plurality of secondary batteries;
a lower housing having an open portion that is open upwards and an inner space formed therein to allow the battery module to be disposed in the inner space; and
an upper housing configured to cover an upper open portion of the lower housing and having an opening formed to allow a portion of the pack terminal to protrude outwards.

14. A vehicle, comprising the battery pack according to claim 13.

15. The electrical assembly according to claim 1, wherein the bus bar mounting groove includes a barrier provided at an entire outer circumference of the bus bar mounting groove and protruding upwards from the bus bar mounting groove to prevent the bus bar from contacting an external conductive object.

* * * * *